(12) United States Patent
McCoy et al.

(10) Patent No.: US 12,011,140 B2
(45) Date of Patent: Jun. 18, 2024

(54) HEATING, VENTILATION, AND AIR CONDITIONING (HVAC) AIR DUCT CLEANING SYSTEM

(71) Applicant: Rotobrush International LLC, Grapevine, TX (US)

(72) Inventors: James Kevin McCoy, Garland, TX (US); Jared A. Smothermon, Lucas, TX (US); Jeffrey Alan Garrett, Allen, TX (US)

(73) Assignee: Rotobrush International LLC, Grapevine, TX (US)

( * ) Notice: Subject to any disclaimer, the term of this patent is extended or adjusted under 35 U.S.C. 154(b) by 336 days.

(21) Appl. No.: 17/683,666

(22) Filed: Mar. 1, 2022

(65) Prior Publication Data

US 2023/0277025 A1 Sep. 7, 2023

(51) Int. Cl.
| | | |
|---|---|---|
| *A47L 9/28* | (2006.01) | |
| *A47L 9/04* | (2006.01) | |
| *B08B 9/045* | (2006.01) | |
| *F24F 11/30* | (2018.01) | |
| *G05B 15/02* | (2006.01) | |

(52) U.S. Cl.
CPC .......... *A47L 9/2842* (2013.01); *A47L 9/0466* (2013.01); *A47L 9/2831* (2013.01); *A47L 9/2857* (2013.01); *B08B 9/045* (2013.01); *F24F 11/30* (2018.01); *G05B 15/02* (2013.01); *B08B 2209/04* (2013.01)

(58) Field of Classification Search
CPC .... A47L 9/2842; A47L 9/0466; A47L 9/2831; A47L 9/2857; B08B 9/045; B08B 2209/04; F24F 11/30; F24F 2221/22; G05B 15/02; G05B 2219/2614
See application file for complete search history.

(56) References Cited

U.S. PATENT DOCUMENTS

| | | |
|---|---|---|
| 3,220,042 A | 11/1965 | Harrington Sr. |
| 4,158,248 A | 6/1979 | Palmer |
| 4,610,702 A | 9/1986 | Krantz |
| 4,870,714 A | 10/1989 | Miner |
| 4,984,329 A | 1/1991 | Wade |
| 5,003,998 A | 4/1991 | Collett |
| 5,317,782 A | 6/1994 | Matsuura et al. |
| 5,400,863 A | 3/1995 | Richardson |
| 5,472,514 A | 12/1995 | Grimsley |

(Continued)

FOREIGN PATENT DOCUMENTS

| | | |
|---|---|---|
| CA | 2670689 A1 | 1/2011 |
| GB | 2036544 A | 7/1980 |

(Continued)

OTHER PUBLICATIONS

USPTO; first Office Action mailed on Dec. 20, 2022 in related U.S. Appl. No. 17/317,091, filed May 11, 2021.

(Continued)

*Primary Examiner* — Ziaul Karim
(74) *Attorney, Agent, or Firm* — Robert H. Frantz

(57) ABSTRACT

A control system and method which automatically responds to a stalling motor due to a brush head binding or hanging event, and which automatically prevents backlash damage to the electronics when the brush head is freed from it's constraints.

24 Claims, 15 Drawing Sheets
(3 of 15 Drawing Sheet(s) Filed in Color)

(56) References Cited

U.S. PATENT DOCUMENTS

| | | | |
|---|---|---|---|
| 5,572,766 | A | 11/1996 | Matsuura et al. |
| 5,584,093 | A | 12/1996 | Melendres |
| 5,608,941 | A | 3/1997 | Kleinfeld |
| 5,655,256 | A | 8/1997 | Hendrix et al. |
| 5,735,016 | A | 4/1998 | Allen et al. |
| 5,813,089 | A | 9/1998 | Nolan et al. |
| 5,819,354 | A | 10/1998 | Alsono et al. |
| 6,014,790 | A | 1/2000 | Smith et al. |
| 6,026,538 | A | 2/2000 | Watanabe |
| 6,032,325 | A | 3/2000 | Smith |
| 6,279,197 | B1 | 8/2001 | Crutcher et al. |
| 6,372,052 | B1 | 4/2002 | Jones |
| 6,375,454 | B1 | 4/2002 | Vilarasau Alegre |
| 6,785,934 | B2 | 9/2004 | Bruno et al. |
| 7,191,489 | B1 | 3/2007 | Heath |
| 7,363,681 | B2 | 4/2008 | Durbin et al. |
| D570,058 | S | 5/2008 | Watson et al. |
| 7,426,768 | B2 | 9/2008 | Peterson et al. |
| 7,917,990 | B2 | 4/2011 | Moroz |
| 8,667,705 | B2 | 3/2014 | Shin et al. |
| 10,746,008 | B2 | 8/2020 | Spoerker |
| 10,746,010 | B2 | 8/2020 | Spoerker |
| 2002/0074219 | A1* | 6/2002 | Crevling ............... A47L 7/0038 200/84 R |
| 2003/0208877 | A1 | 11/2003 | Stanovich et al. |
| 2003/0229421 | A1* | 12/2003 | Chmura ............... A47L 9/2847 700/258 |
| 2004/0047935 | A1* | 3/2004 | Moss ................. B29C 45/2704 425/149 |
| 2004/0103630 | A1* | 6/2004 | Kitchen ................ A01D 46/10 56/13.1 |
| 2005/0108846 | A1 | 5/2005 | Peterson |
| 2005/0109375 | A1* | 5/2005 | Peterson ................ B08B 9/027 134/21 |
| 2006/0195994 | A1* | 9/2006 | Hung ..................... B08B 9/045 15/104.095 |
| 2006/0242783 | A1* | 11/2006 | Peterson ................ B08B 9/043 15/304 |
| 2008/0000040 | A1 | 1/2008 | Peterson |
| 2008/0189905 | A1 | 8/2008 | Peterson et al. |
| 2010/0060216 | A1* | 3/2010 | Woodward ............... H02P 1/16 318/400.09 |
| 2010/0306954 | A1* | 12/2010 | Coscarella ........... A47L 9/0693 15/339 |
| 2011/0254477 | A1* | 10/2011 | Woodward ............... H02P 6/08 318/400.3 |
| 2017/0224185 | A1 | 8/2017 | Smith et al. |
| 2019/0160907 | A1* | 5/2019 | Velazquez .............. B60H 1/248 |
| 2020/0271478 | A1 | 8/2020 | Schmauder |

FOREIGN PATENT DOCUMENTS

| | | |
|---|---|---|
| GB | 2270385 A | 9/1994 |
| KR | 100188518 B1 | 6/1999 |
| WO | 9500262 A1 | 1/1995 |

OTHER PUBLICATIONS

Elledge, Robert; Reply and Amendment filed on Jun. 23, 2023 in related U.S. Appl. No. 17/317,091, filed May 11, 2021.

USPTO; second Office Action mailed on Dec. 2, 2023 in related U.S. Appl. No. 17/317,091, filed May 11, 2021.

USPTO; first office action mailed on Oct. 31, 2023 in related U.S. Appl. No. 17/151,131, filed Jan. 16, 2021.

Elledge, Robert E.; reply to first office action submitted on Jan. 19, 2024 in related U.S. Appl. No. 17/151,131, filed Jan. 16, 2021.

Wikipedia; "Torque"; retrieved Nov. 26, 2021 from https://en.wikipedia.org.

Gibbs, Sam Gavin; "Rod Pumping: Modern Methods of Design, Diagnosis and Surveillance", published by author, 2012, Chapter 2 "The Wave Equation as Applied to Rod Pumping", pp. 33-58.

Hughes, A. and Drury, B.; "Electric Motors and Drives: Fundamentals, Types and Applications", Fifth Edition, Elsevier Science, Aug. 2019, Chapter 2, section 2.4.5, pp. 75-76.

Miller, Jeffrey W.; "Chapter 6: Gibbs Sampling", from Lecture Notes on Bayesian Statistics, Duke Univerisy, Durham, NC, 2015.

Gibbs; Sam Gavin; "Rod Pumping: Modern Methods of Design, Diagnosis and Surveillance", Sections 3.1 through 3.7 of Chapter 3 "Dynomometer-based Methods for Analysis of Existing Wells", pp. 61-81, published by author, Jan. 1, 2021, ISBN 0984966102 and 9780984966103.

Semiconductor Components Ind. LLC; "AN1046/D Two Chip Solution for Brushless Motor Controller Design", Apr. 2012, Rev. 6.

Ulterra; "Weight On Bit—WOB"; retrieved on Nov. 26, 2021 from https://ulterra.com.

Electronics Hub; "Introduction to Brushlles DC Motors (BLDC Motor)"; retrieved on Feb. 15, 2022 from https://www.electronicshub.org.

* cited by examiner

HEATING, VENTILATION, AND AIR CONDITIONING (HVAC) AIR DUCT CLEANING SYSTEM

INCORPORATION BY REFERENCE

U.S. patent application Ser. No. 17/151,131, filed on Jan. 16, 2021, by Robert E. Elledge, and U.S. patent application Ser. No. 17/317,091, filed on May 11, 2021, are hereby incorporated by reference in their entireties.

Sections 3.1 through 3.7 of Chapter 3, entitled "Dynomometer-based Methods for Analysis of Existing Wells", pages 61-81, of the book entitled "Rod Pumping: Modern Methods of Design, Diagnosis and Surveillance", published and authored by Sam Gavin Gibbs, Ph.D., on Jan. 1, 2021, ISBN 0984966102 and 9780984966103, are incorporated by reference.

FIELD OF THE INVENTION

U.S. patent application Ser. No. 17/151,131, filed on Jan. 16, 2021, by Robert E. Elledge, and U.S. patent application Ser. No. 17/317,091, filed on May 11, 2021, are hereby incorporated by reference in their entireties.

Sections 3.1 through 3.7 of Chapter 3, entitled "Dynomometer-based Methods for Analysis of Existing Wells", pages 61-81, of the book entitled "Rod Pumping: Modern Methods of Design, Diagnosis and Surveillance", published and authored by Sam Gavin Gibbs, Ph.D., on Jan. 1, 2021, ISBN 0984966102 and 9780984966103, are incorporated by reference.

The present invention is directed, in general, to an air duct cleaning system for removing dust and debris from air conditioning and heating ducts, dryer vent ducts, etc., of residential and commercial buildings.

BACKGROUND OF INVENTION

So called "house dust" is widely considered by experts to pose health hazards to persons with allergies, asthma, or respiratory disorders and diseases. House dust may contain dirt, textile fibers, pollen, hair, skin flakes, residue of chemical and household products, cat and dog dander, decaying organic matter, dust mites, bacteria, fungi, viruses, and a variety of other contaminants. Literally, pounds of house dust accumulate on vents and in ducts that comprise the ventilating systems of both residential and commercial buildings. This house dust is becoming increasingly more harmful as Americans spend a larger percentage of their waking hours indoors, often aggravating allergies of the inhabitants. Modern heating/ventilating/air conditioning (HVAC) systems typically incorporate air filters either just prior to the circulation fan of the systems or in the return ductwork. However, most often these filters comprise fiberglass or similar media that are reasonably effective against large debris, but are often inadequate in removing fine particulate matter, such as dust, dander, etc., from the circulated air. Such filters may trap as little as twenty percent of the particulate matter circulating in a ventilation system, allowing the remaining dust and debris to circulate in the household or work place. Additionally, it is not uncommon to encounter ductwork that has been improperly installed or maintained. These ducts frequently leak, allowing dust and debris from the duct surroundings to enter the ducts. Often this is a major contributor to duct contamination.

One known approach to remove accumulated debris in ventilation ducts has been to use a rotating brush at the end of a flexible vacuum hose that is fed into each duct from each register location. The hose is fed into an the ductwork of the HVAC system from one or more access points, and as the rotating brush agitates and knocks loose the accumulated debris, and very strong vacuum pulls the loose debris into the hose, through which it travels to the main unit where it is collected.

SUMMARY OF THE EXEMPLARY EMBODIMENTS OF THE INVENTION

A control system and method are disclosed which automatically respond to a stalling motor due to a brush head binding or hanging event, and which automatically prevents backlash damage to the electronics when the brush head is freed from its constraints.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The figures presented herein, when considered in light of this description, form a complete disclosure of one or more embodiments of the invention, wherein like reference numbers in the figures represent similar or same elements or steps.

DETAILED DESCRIPTION OF ONE OR MORE EXEMPLARY EMBODIMENT(S) OF THE INVENTION

Figure 1:
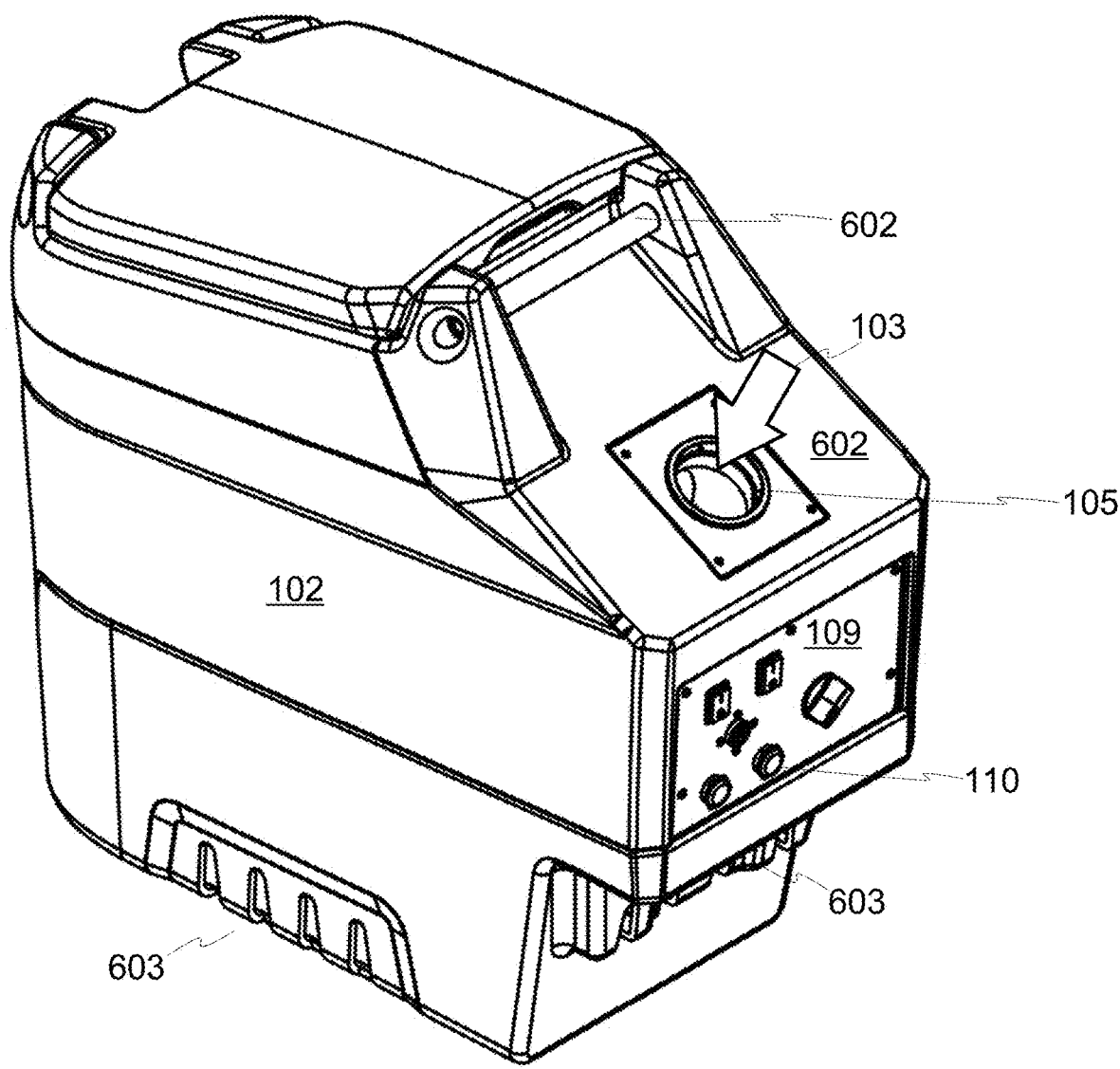
FIG. 1 provides an external view of an embodiment of a duct cleaning system according to the related invention.

The present inventor(s) have recognized that HVAC air duct cleaning systems fail to meet all needs in the present market place. In general, HVAC air duct cleaning systems known to be currently available provide a man-portable main unit which often is mounted on a wheeled cart due to their size and weight. Developing enough negative air pressure (vacuum) to forcefully draw in air from a 3" or 4" diameter hose of 35 feet or more in length requires considerable electric motor power. Those motors are heavy. Further, the main unit must provide some sort of rotational drive mechanism to a rotating cable which extends from the main unit, down the length of the hose section(s), and to the power brush head, where it is converted to rotating energy at the brush. One or more electric motors may be used to develop the strong vacuum are to generate the rotational energy for driving the cable to the power brush head. In at least one available system, generation of rotational energy for driving the cable to the power brush head is accomplished by an alternating current (NC) electric motor through an internal pulley-on-pulley arrangement to the main unit's hose cable connection.

However, the present inventors have realized that there are a number of performance shortcomings in such an NC belt-driven and pulley-on-pulley systems. In a related U.S. patent application Ser. No. 17/151,131, filed on Jan. 16, 2021, by Robert E. Elledge, an improved direct drive system was disclosed which reduced cost, weight and improved control and reliability of a new duct cleaning system. For example, according to the related patent application, if the power brush head of a traditional belt-driven system becomes jammed or in a bind to a degree greater than the force exerted on the rotating cable, the binding force can be transmitted back to the belt-driven or pulley-on-pulley coupling, and, in single-motor systems, to the NC vacuum motor itself. The slowing or stalling of the electric motor results in a power consumption surge by the A/C motor and, in single-motor systems, a drop in vacuum pressure. The pulley-on-pulley coupling can be configured such that it slips at this level of binding and thereby allows the A/C motor to resume turning, albeit perhaps still at a reduced speed and a reduced vacuum generation.

Further, in at least one configuration, the pulley-on-pulley coupling can be provided with a clutch device which disengages the pulley from the armature of the NC motor when the binding or resisting force hits a particular threshold. While this is an effect design technique to release the motor from mechanical coupling to the jammed power brush head, it does nothing to help un-bind the power brush head.

As such, it requires considerable skill by the operator when pushing a power brush head through ductwork without visual observation of the brush's condition to listen to the NC motor's operation, detect when a brush may be entering a bind, withdraw the hose slightly and reposition or rotate it, and then re-attempt advancing the hose into the ductwork.

As disclosed in the related patent application U.S. Ser. No. 17/317,091, there are a number of disadvantages to this approach, and have set about improving the overall usability of such HVAC air duct cleaning systems to allow them to be used effectively by both experienced and novice operators, to maintain a constant vacuum pressure regardless of the brush head's condition, to allow for greater control of the brush head's rotational speed independent of the vacuum pressure generated, and to allow for automation of many of the anti-stall, anti-bind functions traditionally implemented by experienced system operators.

Therefore, the related invention disclosed in U.S. patent application Ser. No. 17/317,091 provided an improved direct drive system. Leveraging the reduction in size and weight of the aforementioned direct drive subsystem, the present inventor has reduced the size and weight of the entire system as disclosed in following paragraphs to yield additional system-level benefits. The following paragraphs are directed in general to any duct cleaning system, while using the inventor's improved direct drive only as an example of internal improvements which can be leveraged to create system-level improvements. However, the related system invention is not limited to such internal improvements, as and such, the internal details are provided only as one possible system-level example. Similar improvements to other systems may be obtained by applying the teachings herein as well.

Further to these improvements, the present inventors are disclosing certain improvements to the control systems for duct cleaning systems which utilize a brushless DC motor, or which utilize a direct drive, or which utilized both a brushless DC motor and a direct drive. While the example embodiments of the present invention will be set forth in relationship to the related invention embodiments, those ordinarily skilled in the art will realize that the present control improvements may be realized with other duct cleaning systems as well.

Figure 2:
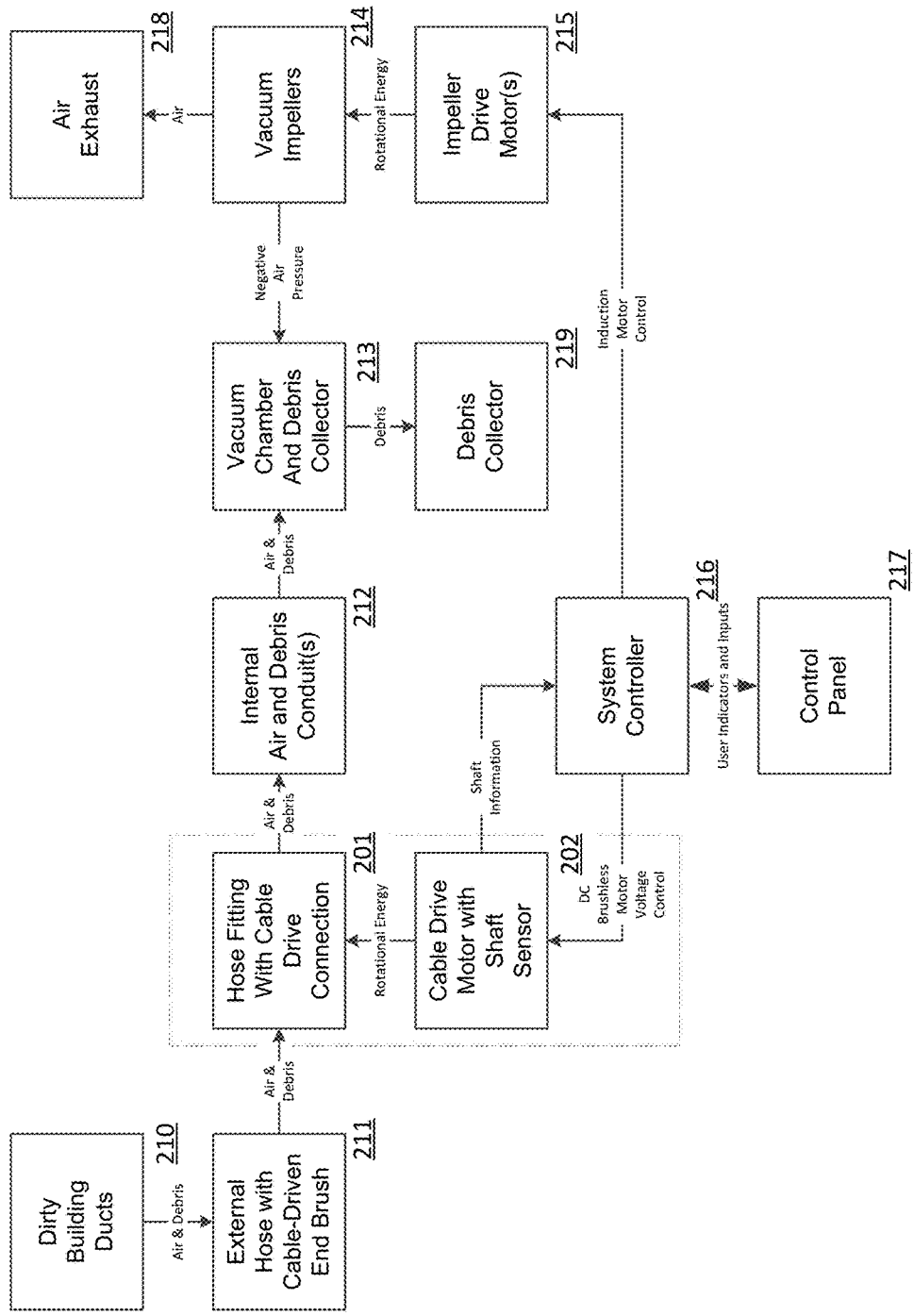
FIG. 2 provides a generalized functional block diagram of a conventional HVAC air duct cleaning system improved to include at least one example embodiment of the related invention.

Related Duct Cleaning System BLDC Direct Drive. For the purposes of disclosing at least one embodiment of the present invention, the brushless DC (BLDC) motor with direct drive embodiments of the related inventions are reviewed in the following paragraphs. Referring now to FIG. 2, a generalized functional block diagram is shown of an HVAC air duct cleaning system 200 incorporating the improvements according to the related invention. The improvements will be readily employed in other systems of other configurations, so this generalized block diagram is provided as an example embodiment according to the invention, which is non-exhaustive of all other embodiments of the related invention to improve other HVAC air duct cleaning systems.

A main unit includes, generally, one or more impeller drive motors 215 which rotate one or more impellers 214 to generate a strong negative air pressure in a vacuum chamber 213 which air and debris are collected. The debris may be separated from the air in which it is suspended by a number of conventional means, such as but not limited to air filtration, cyclonic action, settling, etc., into a debris collector 219. The air, with most of the debris removed, is exhausted from the main unit via one or more vents or exhaust hoses 218.

The air and air-suspended debris are received from the dirty building ducts 210 through the external hose with the power brush head 211 via one or more internal air and debris conduit(s) 212. According to at least one embodiment of the related invention, the system is improved by providing a new brush head cable drive mechanism 202 including a direct current (DC) brushless motor which is preferably separate and apart from the impeller drive motor(s), thereby separating the vacuum power performance from the power brush head performance. If the power brush head gets slowed or bound to a stop, it will couple back to the new DC brushless motor, but will not interfere with the continued vacuum generation of the impeller drive motors, thereby maintaining full vacuum suction and keeping the collected debris aloft.

Still further, according to this particular example embodiment of the related invention, the hose fitting, which is the interconnect between the external hose 211 and the main unit, is improved to receive the rotational energy developed by the new DC cable drive motor 202, with certain additional improvements in preferred embodiments which will be discussed in greater detail in the following paragraphs. The various available embodiment functions can therefore provide certain signals to a system controller 216, such as a microprocessor-based controller unit, and accompanied by certain control panel 217 improvements, which can, for example but not limited to, display the status of the power brush head, and the vacuum suction level of the system during operation.

Further, while the system controller may be enabled to be dynamically capable of adjusting the control of the DC cable drive motor, it is also enabled, in some embodiments, to perform certain anti-stall and anti-bind functions automatically according to shaft movement feedback received from the cable drive motor 202. In some other embodiments, some or all of the additional control features may be omitted and still fall within the spirit and scope of the present invention of an improved direct drive mechanism for an HVAC air duct cleaning system.

Referring now to FIG. 1, a perspective view is shown of a duct cleaning system 600 with its several externally-visible features. An external hose fitting 105 is provided on an external panel 602 of the main unit 102, into which air and suspended debris 103 are pulled using the negative air pressure generated by the main unit. The panel 602 on which the hose fitting 103 is mounted provides a mechanical angle that generally points the connected hose in an approximate 45 degree angle from horizontal (or from vertical), more or less, which facilitates directing of the hose into ducts which are often above waist or shoulder level of the operator. This improvement to the duct cleaning system uses the hose's own semi-rigid property to lift a portion of the weight of the hose so that the user does not have to lift the entire weight of the hose, and it can keep the hose from drooping onto the floor or ground in some situations.

A front-side control panel 109 provides one or more controls, switches, meters, indicators and fuses to allow the user to turn on and off the unit, optionally control the speed and/or torque of the brush head, and optionally see the status of the internal debris reservoir. Electrical connections 110 for a power cord may be provided on any portion of the system, such as on the front panel 109.

Filtered air is ported 603 out of the system 600, such as out periphery of the bottom of the system housing 102. Other ventilation may be provided in the system housing 102 to allow for air to enter or escape to cool the internal motors and circuitry. A storage lid 601 may be incorporated to allow access to accessories and supplies, such as a variety of brush heads.

Incorporating drive mechanism improvements as disclosed in the related patent applications may reduce the size and weight of the system sufficiently to allow it to be carried, rather than carted, so a handle 602 may be provided to allow for carrying the unit instead of rolling it on a cart.

Figure 7:
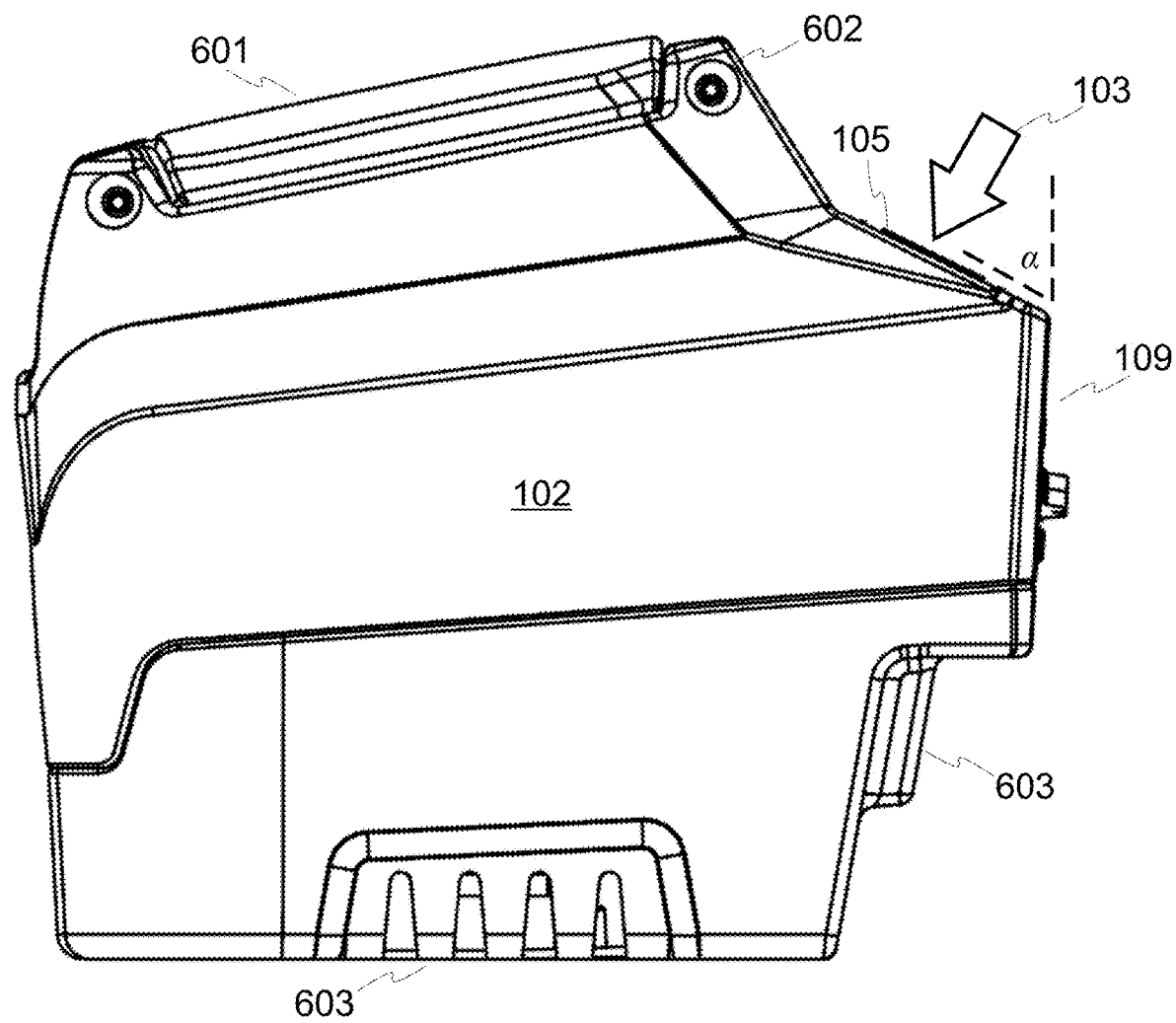
FIG. 7 provides a side view an example embodiment of a system according to the related invention.
Figure 8:
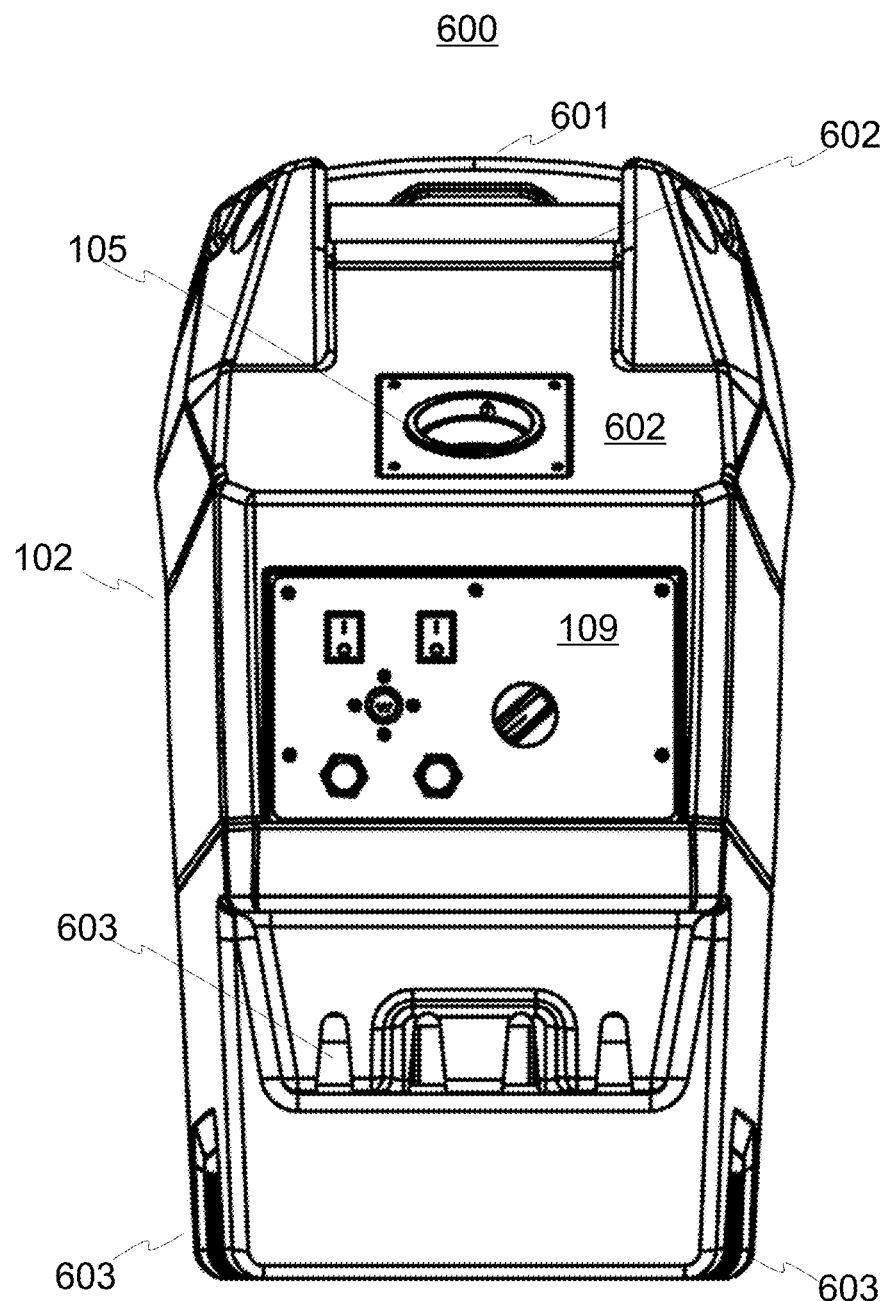
FIG. 8 provides a front view of an example embodiment of a system according to the related invention.
Figure 9:
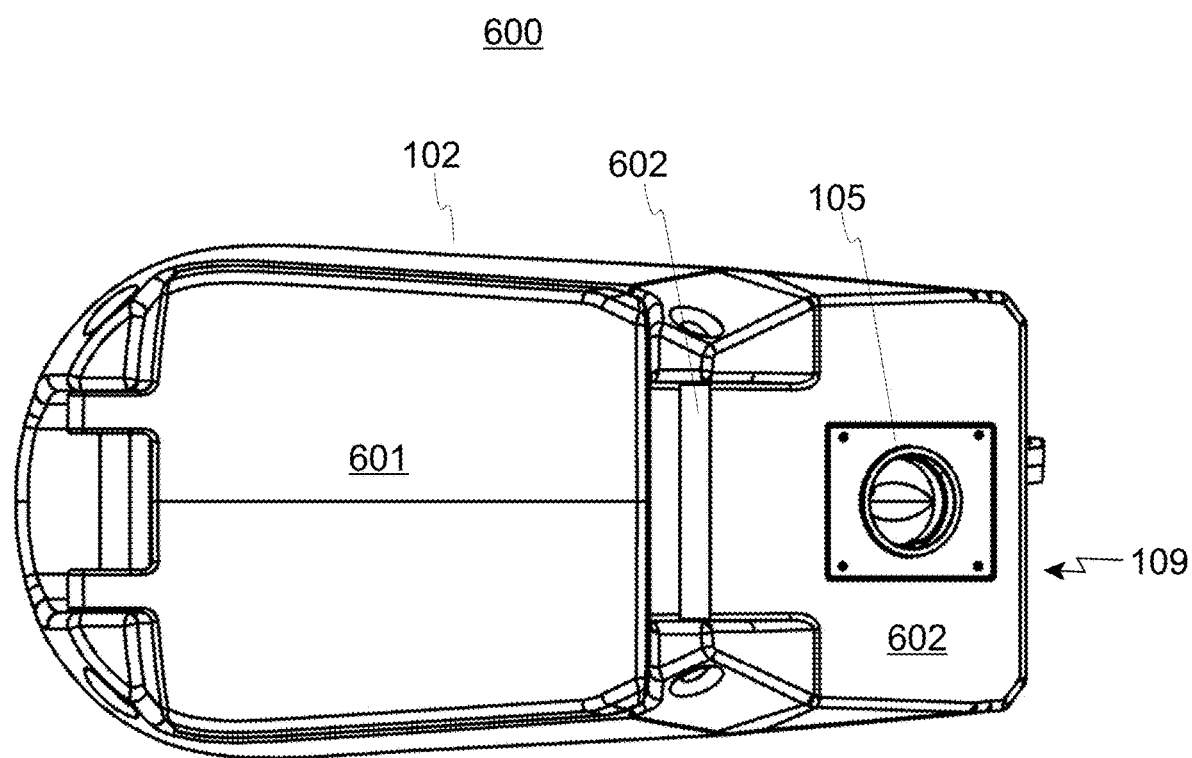
FIG. 9 provides a top view of an example embodiment of system according to the related invention.

FIG. 7 shows a left side view of the example embodiment of FIG. 1, with the right side view being a substantial mirror image of the left side view. In this particular view, the angle α (alpha) of the hose connector 105 is evident which is approximately 45 degrees from vertical (or horizontal). FIG. 8 provides a front view of the same example embodiment, while FIG. 9 provides a top view of the same example of FIG. 1.

Improved Internal Drive Mechanism and Air Flow Management.

Figure 6:
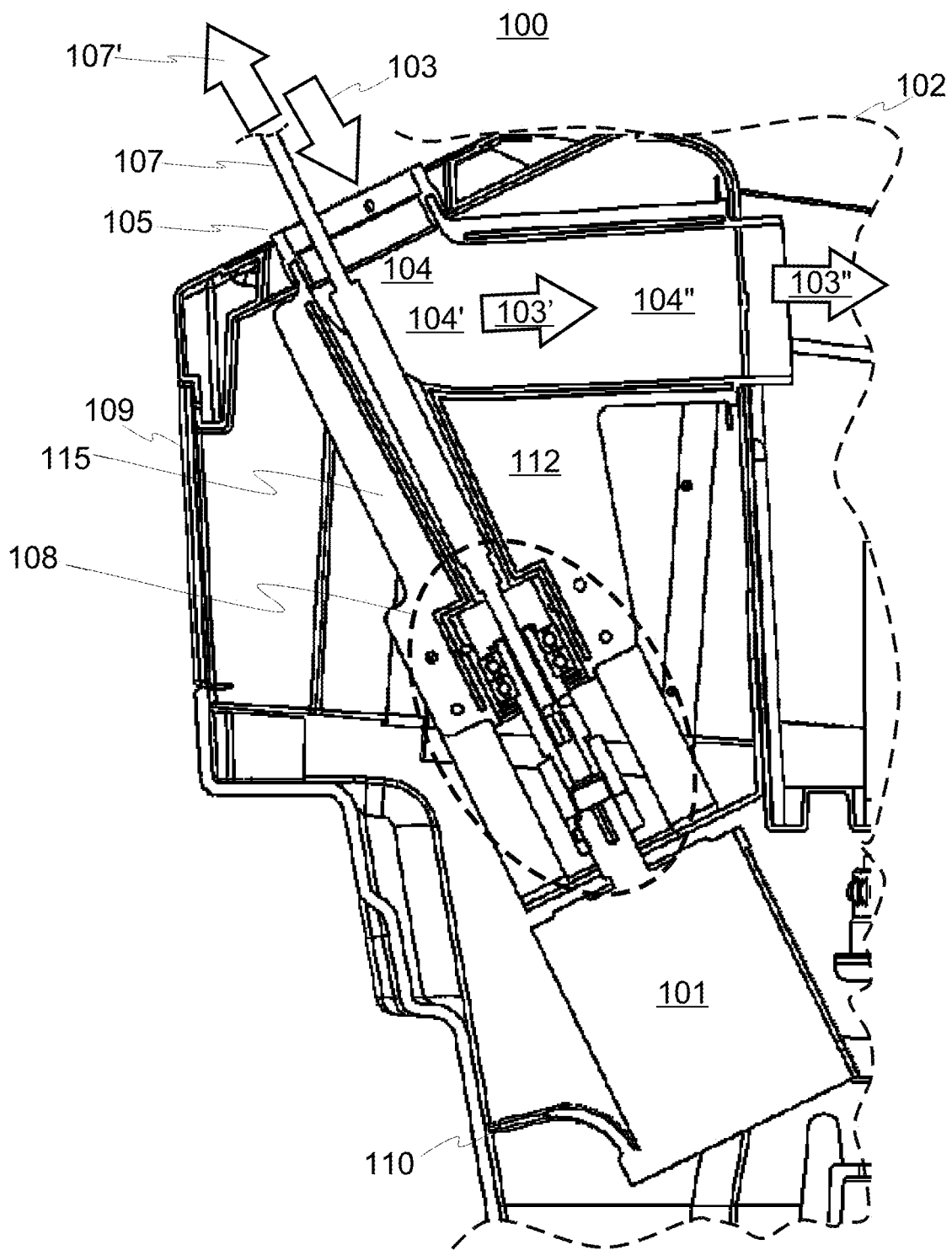
FIG. 6 provides a side cut-away view of an example embodiment of an improved drive mechanism according to the related invention.

Referring now to FIG. 6, which illustrates a cut away side view of a portion of the duct cleaning system 102 according to the improvements disclosed in the related patent application. The air and debris flow 103, with suspended debris, is transitioned in direction through an elbow portion 104' of the internal conduit to a generally horizontal direction of flow 103' through a generally horizontal portion 104" of the conduit towards 103" the air/debris separator and collector in the main unit. In at least this example embodiment, the cross-sectional area of the conduit remains fairly constant through the portions 104, 104' and 104", thereby inducing no considerable change in the velocity of the flow 103 of the air and suspended debris at the coupler 105 to the flow 103' following the elbow to the flow 103" into the air/debris separator and collector (not shown in this view).

In this improved cable drive sub-system 100, a DC brushless motor 101 is directly coupled 108 to the drive cable 107 for providing rotational energy 107' to the power brush head at the end of the attached external hose (not shown in this view). This drive cable is positioned within the hollow interior of the external hose, and a portion of the drive cable 107 extends from the end of the external hose far enough to be received into the coupling 108. Typically, the end of the cable is provided with a "stab-in" connector, such as a D-shaped rod which is received into a corresponding D-shaped reception cavity. In this particular example embodiment, the connection end of the drive cable is received into the drive mechanism 100 at an angle approximately perpendicular to the main unit's panel on which the hose connector 105 is mounted.

Still further in FIG. 6, it is shown that this example embodiment includes two structural reinforcement panels 112 and 115 which provide support between the two generally cylindrical portions of the unit 100, of which one of the cylindrical portions 104', 104" serves as an air and suspended debris conduit and the other cylindrical portion serves as a guide to receive the connection end of the drive cable 107 into the coupler 108. In this example configuration, the DC brushless motor 101 is mounted with its output armature or shaft in direct alignment with the coupled 108 connection end of the drive cable 107. This co-axial alignment of the motor output shaft to the drive cable minimizes energy lost which otherwise would occur in coupling arrangements that include pulleys, differentials or angle gear boxes. Electrical signal and power cables 110 receive power from the system controller 216, if present, and provide shaft rotation sensor information to the system controller 216, if present, where certain improved control methods may be performed as previously mentioned.

As illustrated in this particular example embodiment, several improvements are achieved and enabled by this direct-drive arrangement. First, as it is more compact with fewer components than prior designs using pulleys and belts, it enables the external connection to the cleaning hose to project from the main unit at an angle, rather than horizontally or vertically, which is better for most cleaning situations where the entry ducts are in a ceiling or along a top of a wall. Second, the conduit section which allows for insertion of the cable drive rotational energy into the plenum connected to the external hose has just one elbow or bend in it, thereby reducing cavitation and air flow velocity changes and keeping debris suspended in the moving air better. Third, the new drive mechanism is provided in such a manner that it can be connected to existing vacuum generation chambers of existing HVAC air duct cleaning systems, and requires no changes or upgrades to those other subsystems of legacy main units.

Fourth, by employing a brushless DC motor, more torque at lower speeds is provided to the power brush head at speeds, thereby allowing for greater degrees of control and new automatic features not previously possible with the existing HVAC air duct cleaning systems.

Fifth, by employing a sensor to detect the status of the drive cable, and thereby the status of the DC motor and the power brush, such as a hall effect sensor or shaft encoder, a new system controller can be provided (or improved) to include new constant-power, anti-stall, auto-reverse, and auto-unjam features not possible with legacy systems.

Finally, existing 3" twist-lock external hoses with drive cables contained in their hollow interiors and existing air/debris separation subsystems such as a HEPA air filter can be used with the exemplary embodiment set forth in the foregoing paragraphs.

Figure 3:
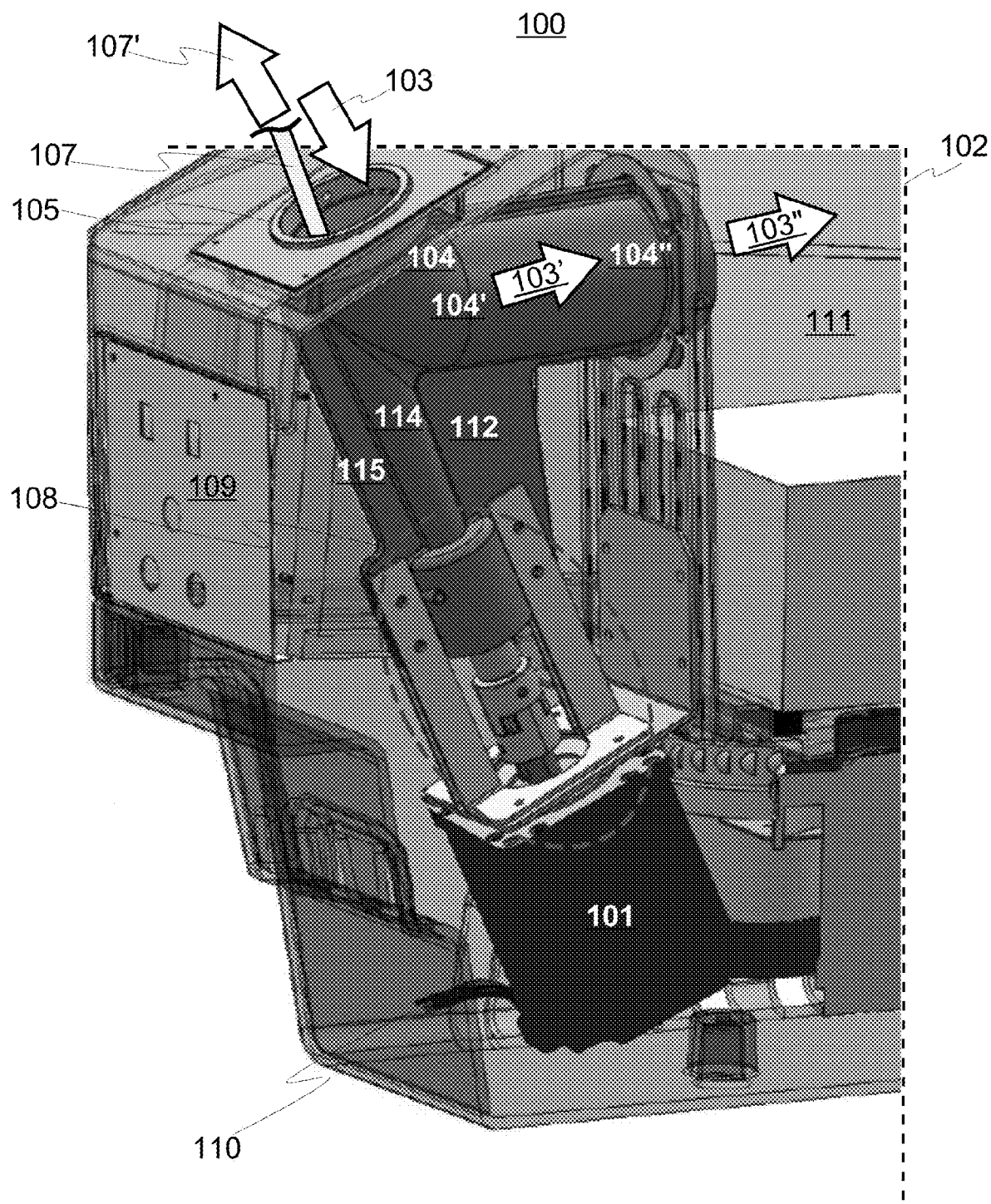
FIG. 3 depicts an angled view rendered in color-coded three-dimensions of a portion of an HVAC air duct cleaning system main unit improved to include at least one example embodiment of the related invention.
Figure 4:
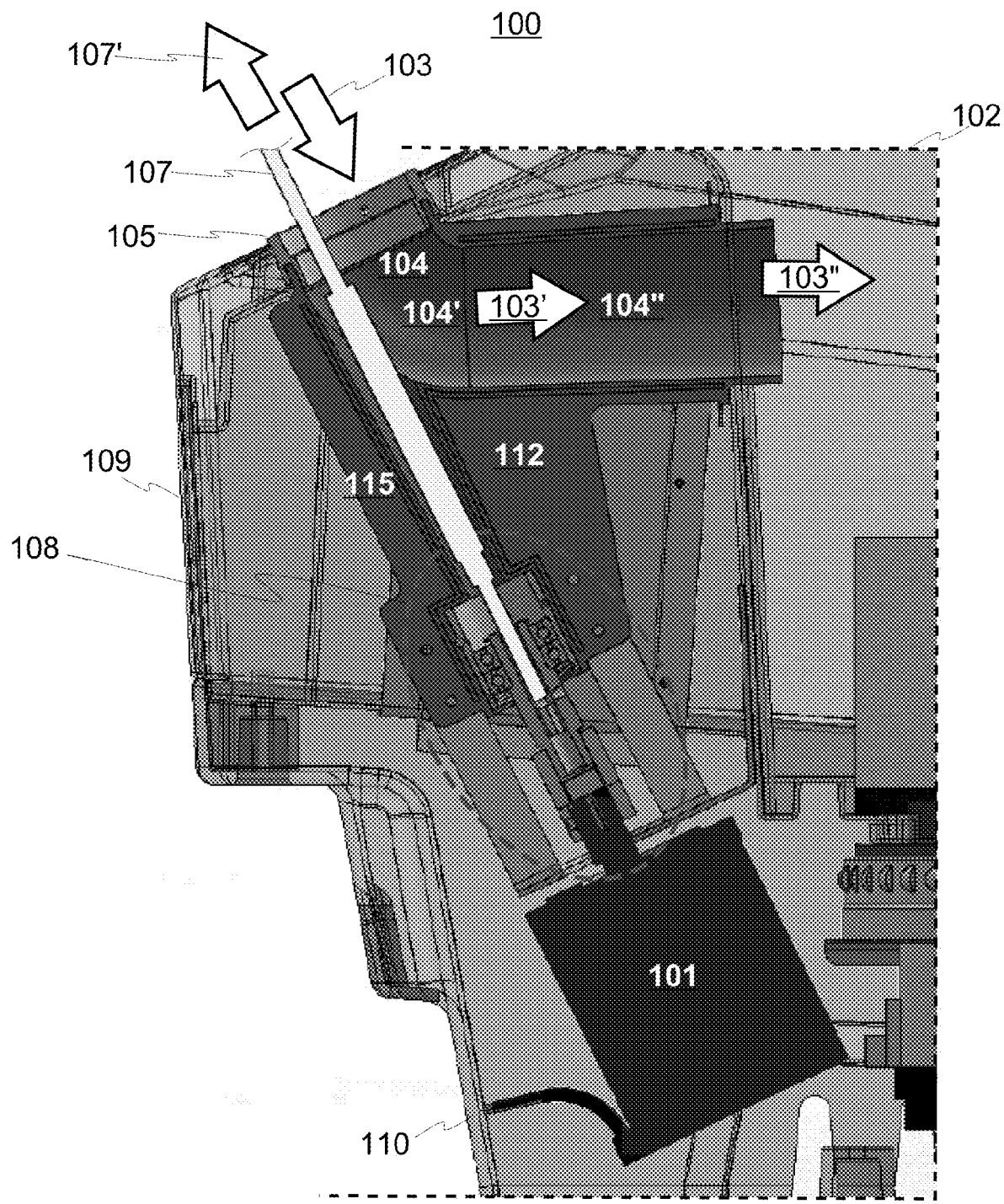
FIG. 4 illustrates a side cut-away view, similar to that of FIG. 6, except rendered in color-coded three-dimensions of a portion of an HVAC air duct cleaning system main unit improved to include at least one example embodiment of the related invention.
Figure 5:
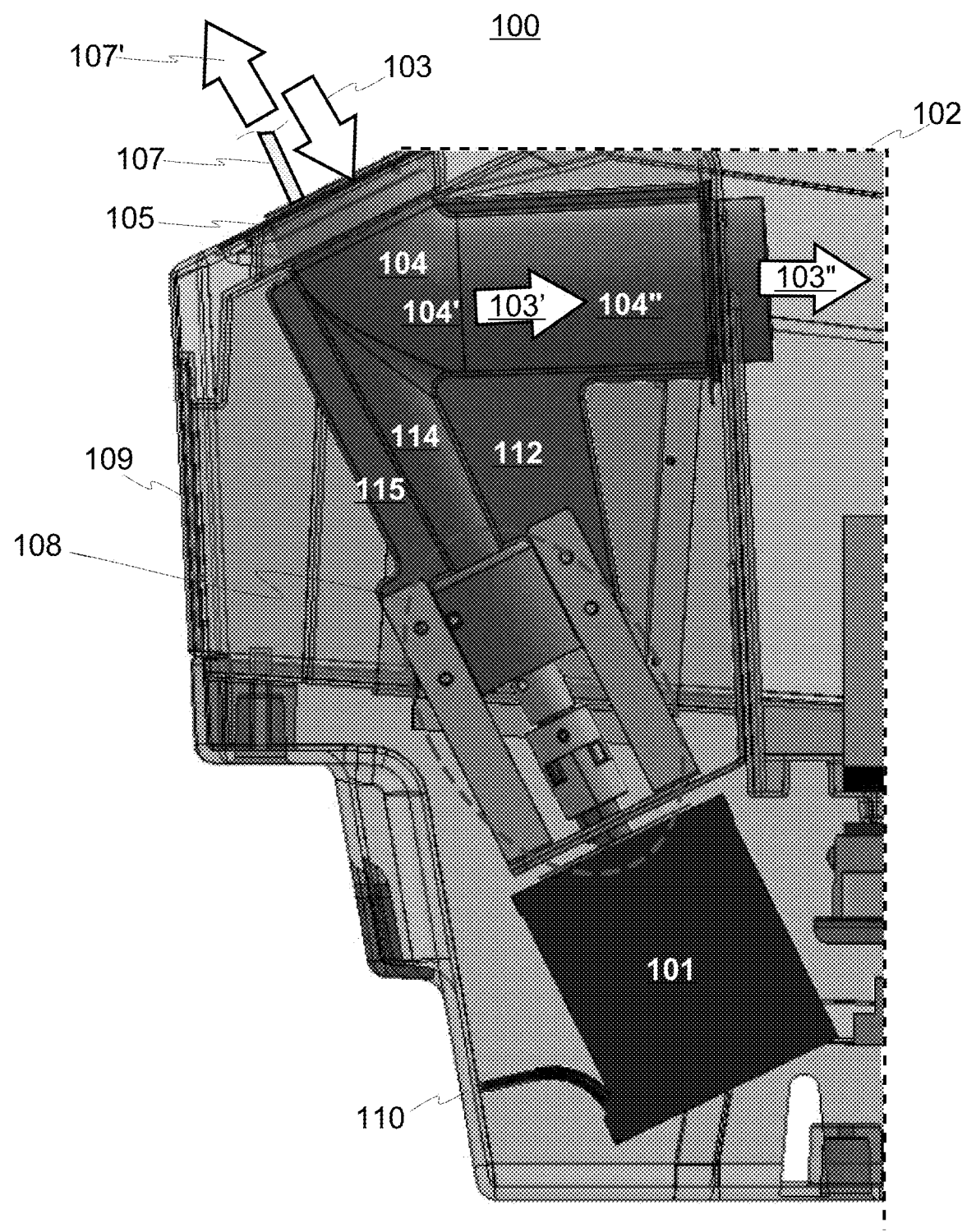
FIG. 5 illustrates a side solid view, similar to that of FIG. 6, except rendered in color-coded three-dimensions of a portion of an HVAC air duct cleaning system main unit improved to include at least one example embodiment of the related invention.

FIGS. 3, 4 and 5 provide various views of the foregoing exemplary embodiment rendered in color and provided with shading to represent three-dimensional shapes of certain components and portions. In FIG. 3, a semi-transparent main unit portion 102 is shown at a slight angle such that a control panel 109 is visible. The improved drive unit 100 is rendered in solid representation (brown), including the support panels 112 and 115, the conduit portions 104, 104', and 104", and the cable coupling guide 114. The brushless DC motor 101 is painted in blue, which is mounted and coupled 108 (components within the red dashed oval) in a co-axial alignment between the motor output shaft and the drive cable 107 connection end (yellow). Other elements of the legacy system are shown in various shades of gray.

FIG. 4 shows the same side-cutaway view as FIG. 6, except in color according to FIG. 3, with a view into the interior (green) of the conduit portions 104, 104', and 104" of the improved example embodiment 100 of a direct-drive subsystem. FIG. 5 is the same view as FIG. 4, except the conduit portions 104, 104', and 104" are rendered in solid representation (brown).

Stall Sensing and Backlash Prevention. The present inventors recognized that at least two previously unrecognized and/or unsolved problems could be solved in the new design using a brushless DC motor (BLDC) with, preferably, a direct drive mechanism as previously discussed. First, the problem of a brush head becoming caught or trapped could be detected automatically and remedial actions could be applied automatically in order to reduce wear and tear on the drive cable, motor, and all mechanical linkages in between the brush head and motor (e.g., pulleys, gears, etc.). When a brush head becomes mechanically bound and cannot rotate freely, traditionally, other portions of the system would suffer, such as the pulley belts slipping and/or the drive cable twisting like a spring. This can cause premature loss of brush power and failure of system components.

Second, when the operator eventually notices that the brush head has become trapped or stuck, they may shut off the motor drive, leaving the twisted drive cable free to unwind by spinning the motor backwards, thereby causing the motor to act as a generator. This sudden output of energy from the motor can damage certain system components which are not designed to sink or absorb energy, but rather to direct energy to the motor (output, not input).

Figure 10:
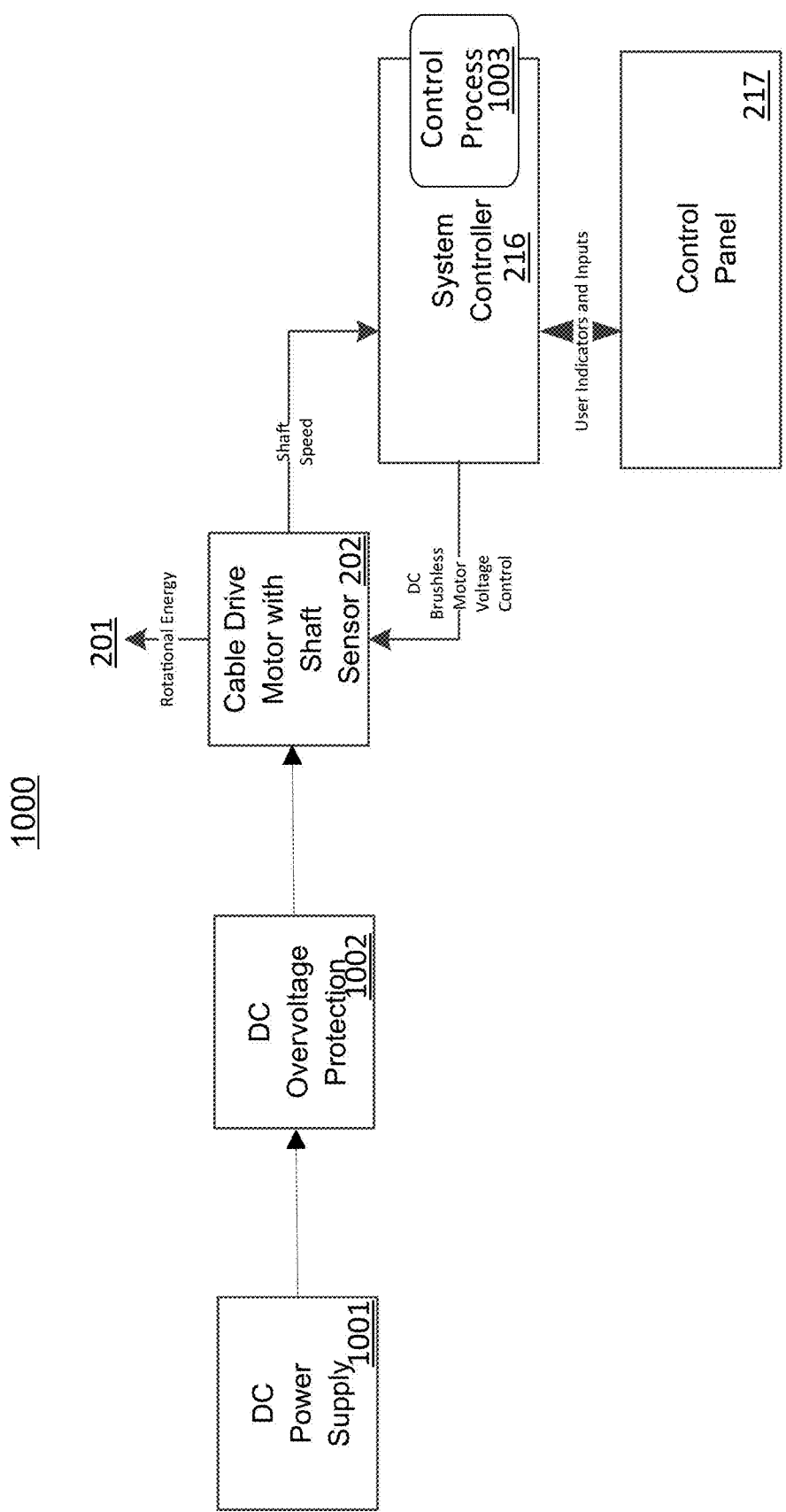
FIG. 10 shows an arrangement of electronic and mechanical components according to at least one embodiment of the present invention.

Turning now to FIG. 10, details of a control system 1000 according to at least one embodiment of the present invention are shown. In this configuration, a DC power supply 1001 is filtered and protected by over-voltage protection 1002. The DC voltage and current are received by a brushless DC motor (BLDC) 202, which typically has its own energy management and sensor monitoring circuitry in addition to a motor. For the reader's clarification, a "BLDC" is actually, typically, a subsystem in and of itself, having its own on-board microcontroller (MCU) or logical device to generate the actual power voltage to the motor, such as modulating a DC voltage using pulse-width modulation (PWM). Most BLDC subsystems include a certain amount of feedback, information and measurements to the rest of the system, such as shaft encoder information and DC motor current consumption measurements. In at least one embodiment of the invention realized by the present inventors, the system inputs a voltage ranging from 0 to 5 VDC to the BLDC subsystem to command it to run the motor from 0 RPM to maximum RPM. The BLDC subsystem, in this configuration, interprets that received 0-5 VDC signal to generate appropriate 0-24 VDC PWM to the actual motor. And, the system receives from the BLDC subsystem feedback on the amount of current being consumed by the motor as well as the position or speed of the shaft of the motor. For the rest of the disclosure, we will refer to the BLDC subsystem simply as the BLDC, with the understanding that it can refer to a subsystem having pre-integrated motor microcontroller (or logic device) with a motor or, in other embodiments, a configuration of discrete motor controller devices (PWM generator, etc.) such as but not limited to an ON Semiconductor [TM] AN1046/D Two Chip Solution for Brushless Motor Controller Design available from Semiconductor Components Industries, LLC, [TM] of Phoenix, Arizona, USA, a brushless motor and typical support circuit components.

The system controller 216 typically contains at least one microprocessor and/or one or more logic circuits which is/are capable of implementing and executing a logical process 1003 in which the following improvements are realized. The user may be informed of certain system conditions and may also be able to enable, disable, or adjust thresholds via a control panel 217, such as a display, touchscreen, set of buttons or switches, etc. The control process 1003 may receive or monitor the speed of the motor shaft, the instantaneous (real-time) bulk current being received by BLDC, and is able to adjust the control voltage to the BLDC to increase or decrease motor speed, to the extent possible in view of resistance presented to the motor's output 201 from the drive cable from the brush head. In at least one embodiment, the normal control voltage input from the system controller 216 to the BLDC subsystem 202 is 24-36 VDC. The control process 1003 can determine the approximate power being delivered to the brush head as the product (multiplication) of the speed of the motor shaft and the torque output of the motor. The torque of the motor can be approximated using tables or curves (digitized) provided by the manufacturer of the BLDC motor as a function of instantaneous bulk current input.

Figure 11:
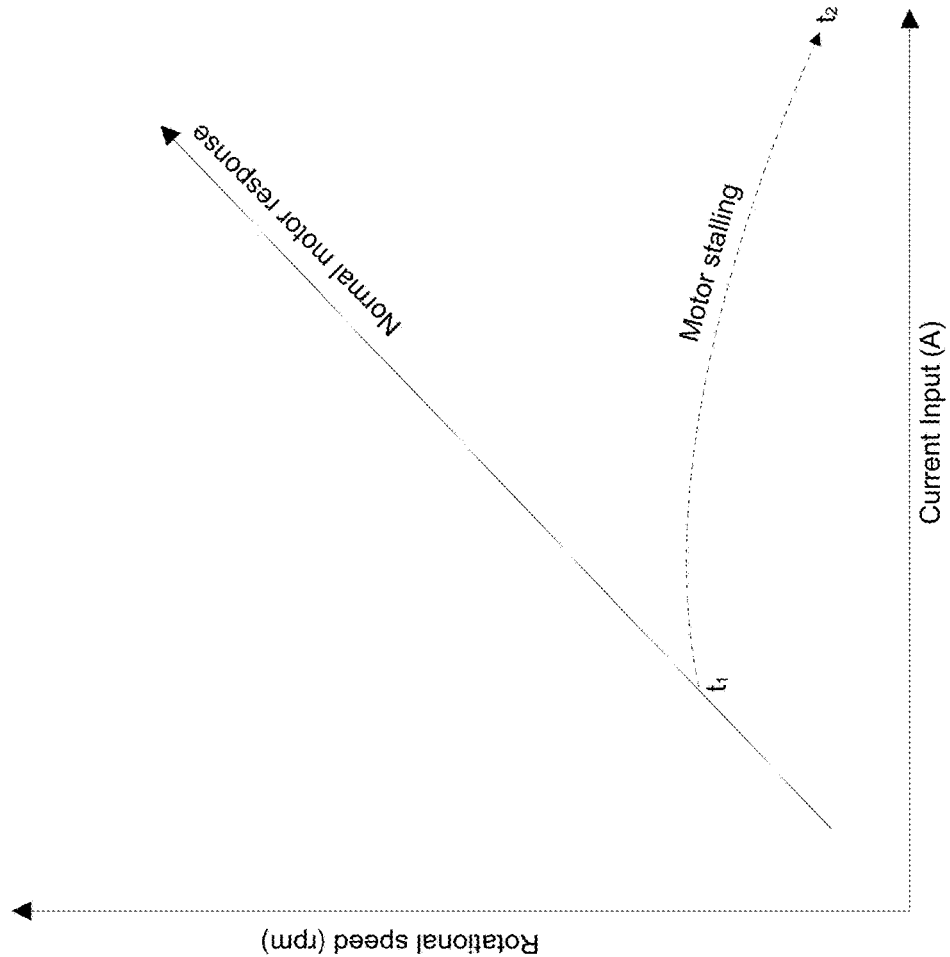
FIG. 11 illustrates a generalized relationship between current input to an electric motor and rotational speed.

Referring now to FIG. 11, a generalized relationship 1100 between rotational speed of a motor and input current is shown. Although shown as a straight line, normal motor response may not be exactly linear, but for the purposes of illustrating the problem solved, we present a generally positive proportional relationship such that the greater the motor speed is, the greater the current consumed is, within limits. However, as the motor comes under load, and especially as it is resisted to the point of stalling, current may continue to increase while motor speed actually decreases, as shown with the dashed line.

Figure 12:
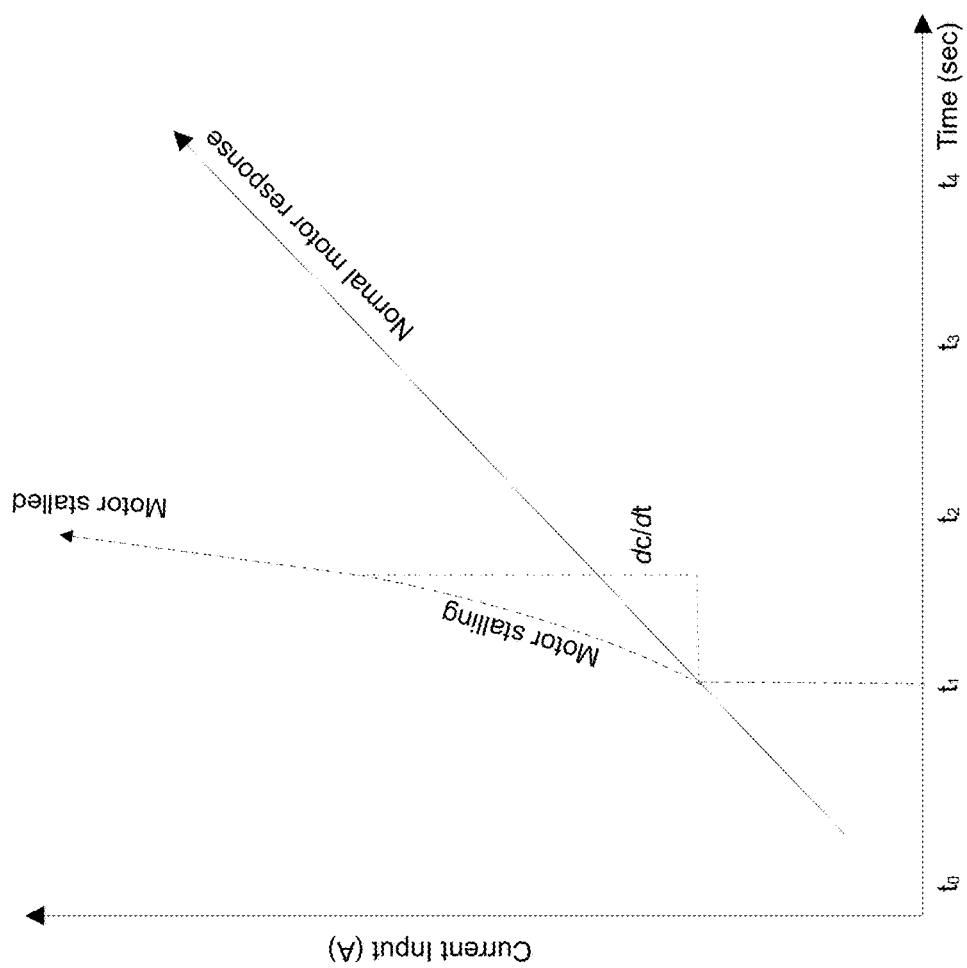
FIG. 12 depicts a generalized relationship between current input to an electric motor and time with respect to stall and bind-up events.

FIG. 12 provides a generalized relationship 1200 between time of operation and motor current input when $t_1$ the motor is beginning to stall and when $t_2$ it becomes fully stalled (stopped). Specific times are not given because, depending on the specific situation, the transition between stalling and stalled may take many seconds or just 1 or 2 seconds. According to one aspect of the present invention, the improved system controller and control process 1003 monitors current input, and determines the change of current input over time, dc/dt. If the rate of change of current input (i.e., the first derivative of real time current input) exceeds a certain threshold, then the system controller predicts a stall is imminent and initiates remediation action(s), as will be discussed in the following paragraphs.

Figure 13:
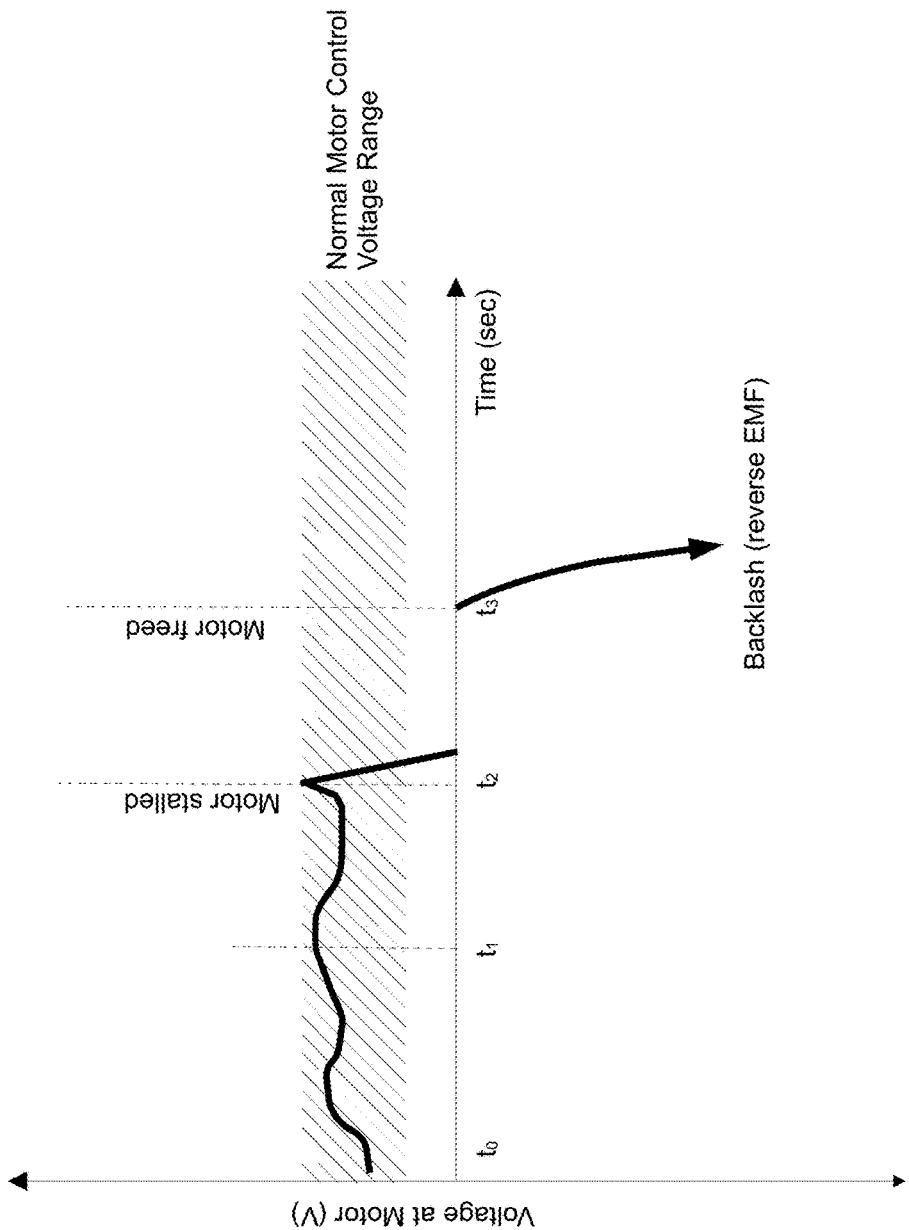
FIG. 13 shows a generalized, hypothetical relationship between motor voltage, stalling, and reverse EMF events.

Turning to FIG. 13, a typical scenario 1300 of backlash or reverse EMF is shown for reference, which is one of the problems addressed and solved by the present invention. This diagram shows the voltage at the motor's input, which can be positive or negative (reverse). Under normal times of control, such as $t_0$ to $t_1$, the system controller can control the speed, and thus the torque and power, of the brush head via the normal range of motor control input voltages. However, as the brush head begins to stall at $t_1$, the motor continues to try to turn the drive cable, and the cable begins to twist and store the energy that cannot be dissipated by the brush head. As the drive cable continues to twist and wind up (linearly), it begins to present more resistance to being turned by the motor, so the motor speed may slow and the current input increase (as shown in the previous diagrams). Finally, the motor becomes fully stalled at $t_2$. Without the benefits of the present invention, it is likely that the operator notices the stalled motor, such as by squealing of a belt or humming of a bound up electric motor, so the operator gives a hard pull on the hose to withdraw the brush head from where it is bound or caught up. Or, the operator may first turn off the motor, which eliminates all forward turning pressure on the drive cable from the motor at $t_3$. When this happens, the twisted drive cable may suddenly unwind in the opposite (reverse) direction, discharging its stored energy into the shaft of the motor and turning it backwards. During this time, the motor is turned in reverse and may act as a generator, generating a voltage at it's input (now acting as outputs) which is received by the control circuit. This backlash or reverse electromotive force (EMF) can damage components of legacy systems.

Figure 14:
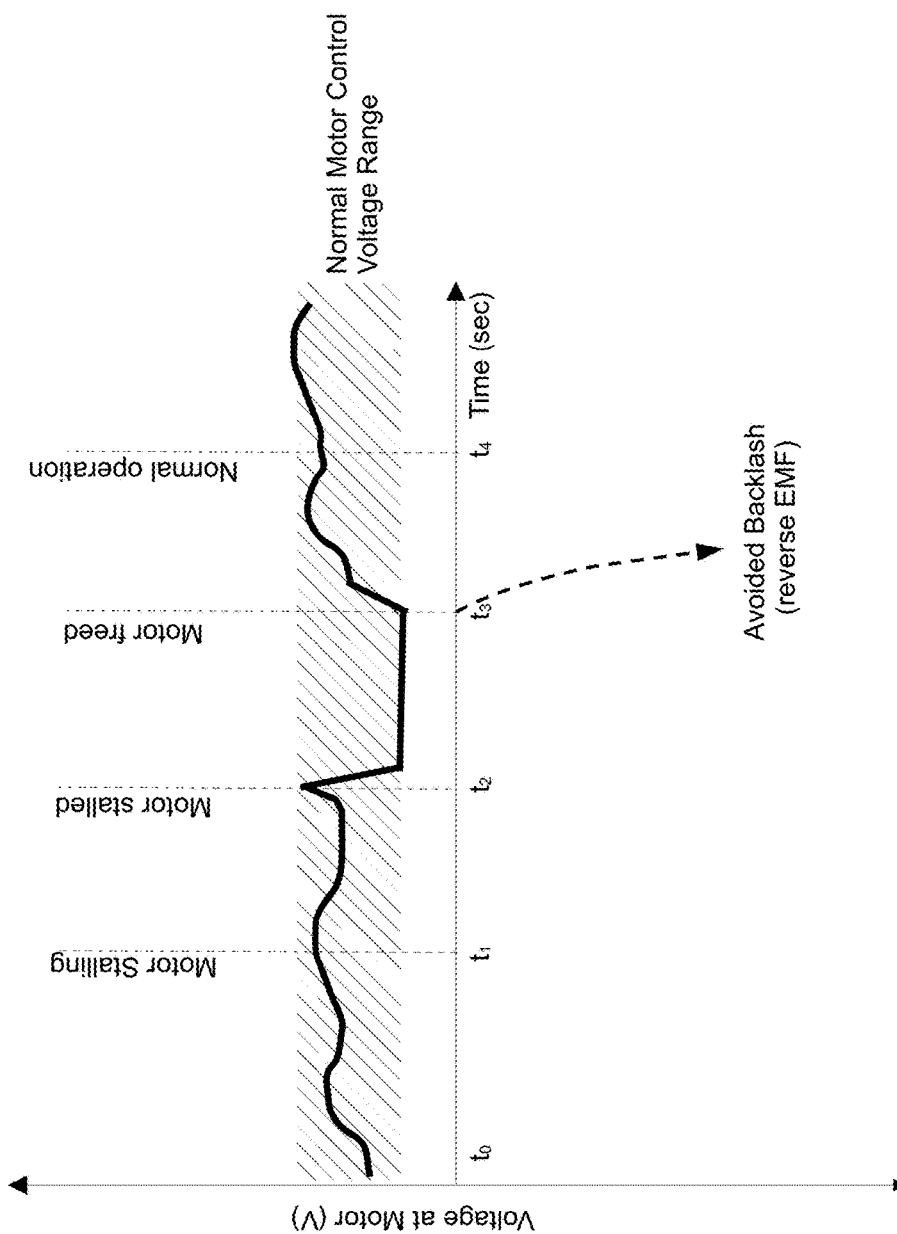
FIG. 14 illustrates the improvements of at least one embodiment according to the invention which prevents reverse EMF damage following a motor stall event.

Therefore, according to at least one aspect of some embodiments of the present invention, when the rate of current input to the motor versus the motor shaft speed is detected to exceed a certain threshold by the improved system controller, certain remediation actions can be taken to reduce or avoid backlash EMF effects, as shown 1400 in FIG. 14. In one such example embodiment, when a stall is detected at $t_2$, the system controller maintains a minimum voltage application to the motor, such as 24 VDC, until the motor resumes normal response to current input at $t_3$. By providing constant (minimal) mechanical pressure in the forward rotating direction, this process prevents the drive cable for suddenly and uncontrolled unwinding in the reverse direction, until the brush head is freed by the operator. When the brush head is freed, the energy stored in the twisted drive cable will dissipate by spinning the brush head in the forward direction until the normal state of the cable and head are regained, and normal operation resumes at $t_4$. To promote the operator allowing the system to deal with the stall automatically, in at least one example embodiment of the present invention, a stall indicator is provided to the operator on a control panel so that the operator knows the motor energy has automatically been reduced accordingly without the need to shut it entirely off. In practice, these time periods may be as long as several seconds or longer, or as short as 2-3 seconds.

Figure 15:
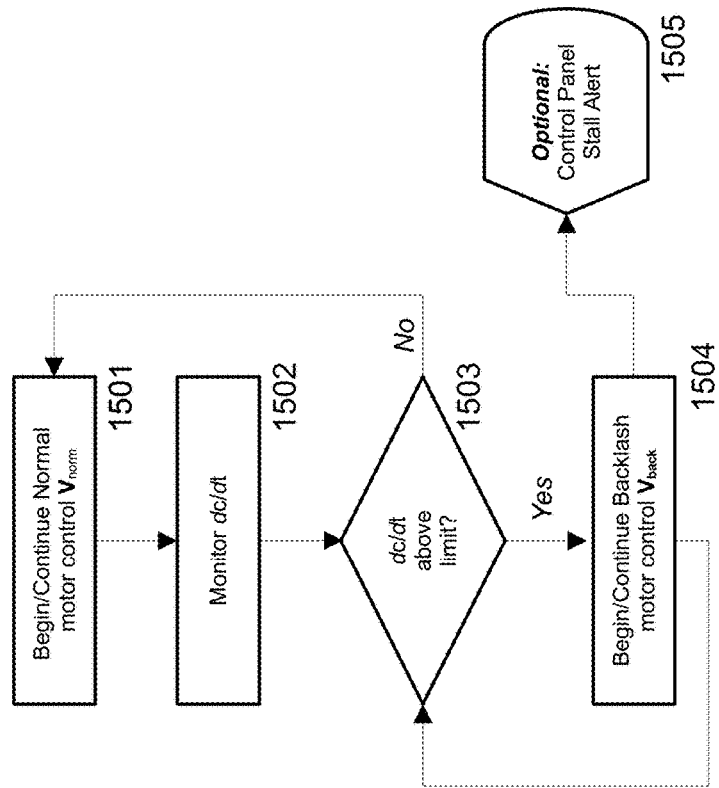
FIG. 15 sets for a logical process of at least one embodiment according to the present invention to realize the control features and benefits.

Referring now to FIG. 15, and example embodiment 1500 of a logical process according to the present invention is shown. Such a logical process can be embodied in software or firmware and executed by a microprocessor of the system controller, or it may be embodied in logic circuitry, or a combination of all of the software, firmware and circuitry. The normal control process 1501 of modulating motor control voltage to achieve target motor shaft speed and brush head power is started, while the rate of change of motor current input dc/dt is monitored 1502. If the rate of change of current input exceeds a pre-determined threshold 1503 (or, a user-adjustable threshold), normal motor control is suspended and stall-backlash prevention motor control 1504 is started.

During stall-backlash prevention motor control 1504, various remediation actions can be taken, such as providing the user an indication of automatic stall recovery being activated on a control panel 1505, preventing sudden disconnect of power or reverse of motor direction from the control panel for a period of time, and applying an amount of voltage to the motor to counter-act the reverse unwinding pressure from the drive cable for a period of time.

When the monitoring 1502 of the rate of current input to the motor is determined to be normal (e.g., below the threshold) or after a timeout period, normal motor control is resumed 1501.

Yet another benefit of some embodiments of the present invention is that the typical DC over-voltage protection 1002 may be reduced or eliminated because the improved system controller prevents some (or all) of the sources of over-voltage. This reduction in electronic hardware can reduce cost of the duct cleaning system, while improving reliability by eliminating components than are stressed and can fail prematurely.

Advanced Estimation of Brush Head Power or Torque. In another improvement according to the present invention, the drive cable between the drive motor and the brush head is treated by the system controller methods as a mechanical energy transmission line. In this manner, transmission line estimation processes which are typically employed for devices such as down-hole drilling for oil and gas can be adapted and applied to the present solution to determine the amount of power (or torque) being delivered to the brush head after accounting for loss in the drive cable (e.g., friction, twisting, etc.). In particular, processes similar to "weight on bit" methods are employed, such as that which was developed and described by Sam Gavin Gibbs, Ph.D., in Chapter 3 of "ROD PUMPING: Modern Methods of Design, Diagnosis, and Surveillance" (copyright 2012 by author, ISBN 0984966102).

Of particular interest as applied by the present inventors, Gibb's taught in section 3.2 his unique approach to obtaining "at the bit" "dynamometer" readings from measurements at the surface, by "inversing out" the wave propagation effects of the rod-linkage. Gibbs' use of term "dynamometer" is a little non-standard within the relevant art, such as the Wikipedia definition of dynamometer, which typically refers to measuring rotational speed and torque. Gibbs' usage, however, referred to linear displacement verses load ("weight on bit") to arrive at his diagnostic "downhole pump card".

To determine a force or "weight on bit" (WOB) in oil and gas drilling applications, in which the drilling motor is separated over long distances from the drilling bit by a plurality of sections of drilling pipe, and in which the drilling pipe is subject to loss of power due to friction, twisting, bending, etc., the Gibbs' process used the known factors of load cell force measurement at the motor output and displacement of the rod from the ground surface to the drill bit. Gibbs' developed a partial differential equation which describes a "wave equation" of the linked rod system going from the surface to the bit, which behaves like a transmission line. Using this partial differential equation, the effect of the transmission line (e.g., losses) can be "inversed out" to estimate what the displacement vs. force curve must be from observed measurements at the surface.

In at least one embodiment according to the present invention, the duct cleaning drive motor is addressed analogously to the motor in the deep well drilling arrangement, the drive cable is addressed analogously to Gibb's links of drilling pipe between the drilling motor and drill bit, and the brush head is addressed analogously to Gibb's drill bit. In so doing, a wave equation can be used to inverse out the torque or power loss in the drive cable, to infer or estimate the net power being delivered to the brush head. And, when that net power (or torque) falls below a threshold relative to motor output, stalling can be detected, thereby enabling automatic control responses to the stalling.

In particular, the adapted and improved process estimates rotational velocity and torque at the position of the brush, which is at the other end of a springy cable subject to changes in losses as it is bent, straightened and twisted while it is advanced through a network of air ducts of unknown topology. By approaching this configuration and problem using transmission line model in a Gibbs-like fashion, the advanced an improved control system can better estimate Conclusion. The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Certain embodiments utilizing a microprocessor executing a logical process may also be realized through customized electronic circuitry performing the same logical process (es). The foregoing example embodiments do not define the extent or scope of the present invention, but instead are provided as illustrations of how to make and use at least one embodiment of the invention.

What is claimed is:

1. An improved control method for air handling duct cleaner, comprising:
   receiving, by a system controller, a real-time measurement of current being drawn into an electric motor of an air handling duct cleaner, while controlling a voltage to the electric motor to achieve a target motor speed in a first mode of control;
   determining, by the system controller, a rate of change over time from the current measurement; and
   responsive to the rate of change of current measurement exceeding a first threshold, discontinuing, by the system controller, the first mode of control and enabling a second mode of control, wherein the second mode of control comprises applying a hold voltage to the electric motor to prevent reverse electromotive force from being induced into the motor from a mechanical release of a bound up drive cable mechanically driven by the electric motor.

2. The method as set forth in claim 1 further comprising:
   subsequent to enabling the second mode of control, monitoring, by the system controller, the real-time measurement of current being drawn into the electric motor; and
   responsive to determining, by the system controller, that the rated of change has fallen below a second threshold, disabling the second mode of control and re-enabling the first mode of control.

3. The method as set forth in claim 1 further comprising:
   determining, by the processor, while in the first mode of control, a torque value of the electric motor based upon the real-time current input measurement; and
   selecting, by the processor, the first threshold from a plurality of thresholds according to the torque value.

4. The method as set forth in claim 1 wherein the enabling of the second mode of control further comprises issuing a user alert on a control panel, display, or indicator.

5. The method as set forth in claim 1 wherein the electric motor comprises a brushless direct current motor.

6. The method as set forth in claim 1 further comprising automatically detecting, by the system controller, stalling of a brush head of the air handling duct cleaner, and responsive to the detecting, automatically reducing, by the system controller, voltage to the electric motor.

7. The method as set forth in claim 6 wherein the automatically detecting of stalling of the brush head comprises employing a weight-on-bit method to estimate a net torque of the brush head.

8. The method as set forth in claim 7 wherein the weight-on-bit method comprises a transmission line model.

9. A computer program product for improved air handling duct cleaner control, comprising:
   one or more tangible, computer-readable memory devices which are not a propagating signals per se;
   computer-executable program instructions embodied by the one or more memory devices for causing a processor to perform the steps of:
      receiving a real-time measurement of current being drawn into an electric motor of an air handling duct cleaner, while controlling a voltage to the electric motor to achieve a target motor speed in a first mode of control;

determining a rate of change over time from the current measurement; and responsive to the rate of change of current measurement exceeding a first threshold, discontinuing the first mode of control and enabling a second mode of control, wherein the second mode of control comprises applying a hold voltage to the electric motor to prevent reverse electromotive force from being induced into the motor from a mechanical release of a bound up drive cable mechanically driven by the electric motor.

10. The computer program product as set forth in claim 9 wherein the program instructions further comprise program instructions for:

subsequent to enabling the second mode of control, monitoring the real-time measurement of current being drawn into the electric motor; and responsive to determining that the rated of change has fallen below a second threshold, disabling the second mode of control and re-enabling the first mode of control.

11. The computer program product as set forth in claim 9 wherein the program instructions further comprise program instructions for:

determining while in the first mode of control, a torque value of the electric motor based upon the real-time current input measurement; and selecting the first threshold from a plurality of thresholds according to the torque value.

12. The computer program product as set forth in claim 9 wherein the enabling of the second mode of control further comprises issuing a user alert on a control panel, display, or indicator.

13. The computer program product as set forth in claim 9 wherein the electric motor comprises a brushless direct current motor.

14. The computer program product as set forth in claim 9 wherein the program instructions further comprise program instructions for:

automatically detecting stalling of a brush head of the air handling duct cleaner; and responsive to the detecting, automatically reducing voltage to the electric motor.

15. The computer program product as set forth in claim 14 wherein the automatically detecting of stalling of the brush head comprises employing a weight-on-bit method to estimate a net torque of the brush head.

16. The computer program product as set forth in claim 15 wherein the weight-on-bit method comprises a transmission line model.

17. A system for improved air handling duct cleaner control, comprising:

one or more tangible, computer-readable memory devices which are not a propagating signals per se;

computer-executable program instructions embodied by the one or more memory devices for causing a processor to perform the steps of:

receiving a real-time measurement of current being drawn into an electric motor of an air handling duct cleaner, while controlling a voltage to the electric motor to achieve a target motor speed in a first mode of control;

determining a rate of change over time from the current measurement; and responsive to the rate of change of current measurement exceeding a first threshold, discontinuing the first mode of control and enabling a second mode of control, wherein the second mode of control comprises applying a hold voltage to the electric motor to prevent reverse electromotive force from being induced into the motor from a mechanical release of a bound up drive cable mechanically driven by the electric motor.

18. The system as set forth in claim 17 wherein the program instructions further comprise program instructions for:

subsequent to enabling the second mode of control, monitoring the real-time measurement of current being drawn into the electric motor; and responsive to determining that the rated of change has fallen below a second threshold, disabling the second mode of control and re-enabling the first mode of control.

19. The system as set forth in claim 17 wherein the program instructions further comprise program instructions for:

determining while in the first mode of control, a torque value of the electric motor based upon the real-time current input measurement; and selecting the first threshold from a plurality of thresholds according to the torque value.

20. The system as set forth in claim 17 wherein the enabling of the second mode of control further comprises issuing a user alert on a control panel, display, or indicator.

21. The system as set forth in claim 17 wherein the electric motor comprises a brushless direct current motor.

22. The system as set forth in claim 17 wherein the program instructions further comprise program instructions for:

automatically detecting stalling of a brush head of the air handling duct cleaner; and responsive to the detecting, automatically reducing voltage to the electric motor.

23. The system as set forth in claim 22 wherein the automatically detecting of stalling of the brush head comprises employing a weight-on-bit method to estimate a net torque of the brush head.

24. The system as set forth in claim 23 wherein the weight-on-bit method comprises a transmission line model.

* * * * *